(No Model.)
C. FAIRBAIRN & M. WELLS.
APPARATUS FOR FORGING SCREWS BY ROLLING.
No. 516,764. Patented Mar. 20, 1894.
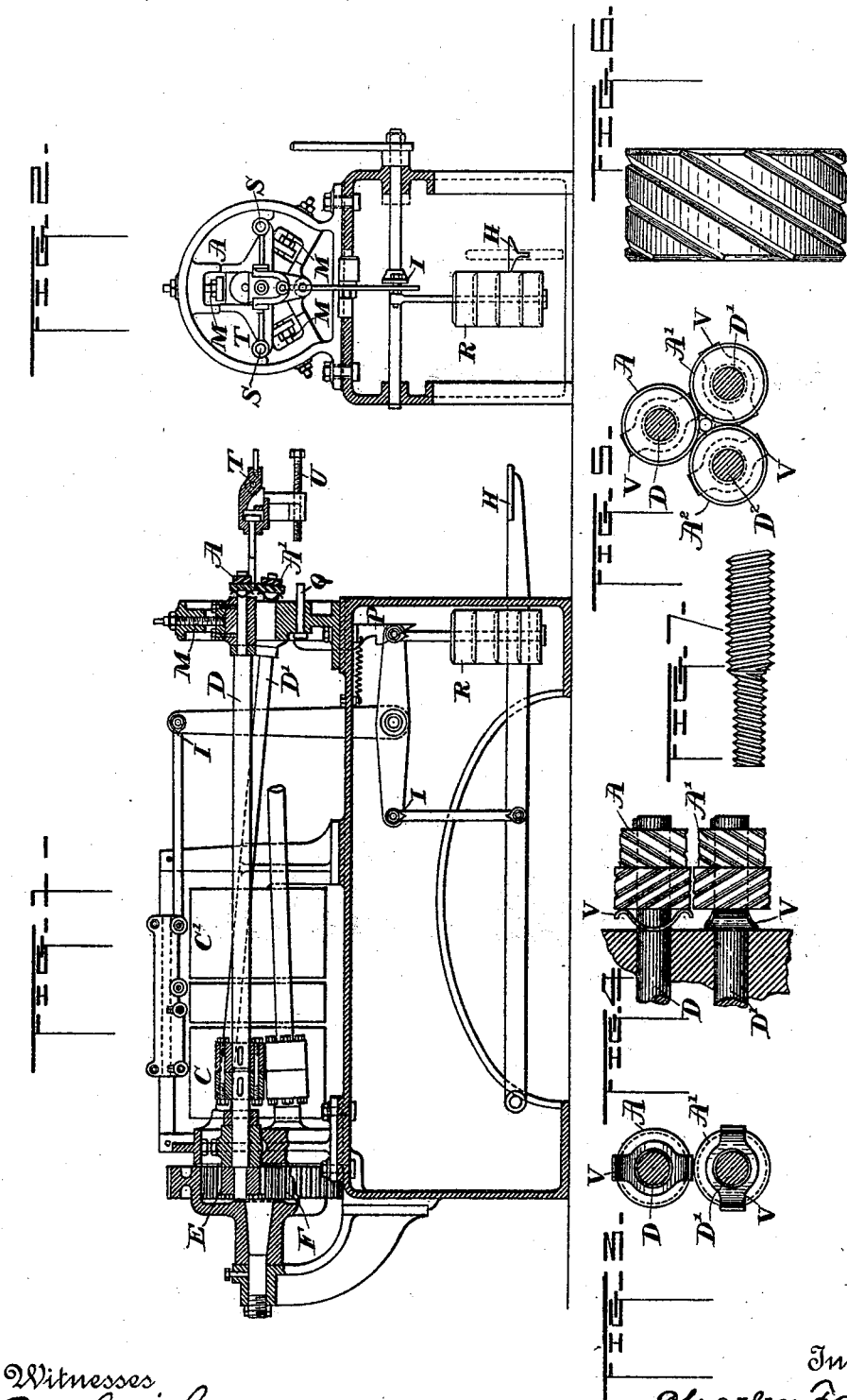
Witnesses
Inventors
Charles Fairbairn
and Matthew Wells

UNITED STATES PATENT OFFICE.

CHARLES FAIRBAIRN AND MATTHEW WELLS, OF MANCHESTER, ENGLAND.

APPARATUS FOR FORGING SCREWS BY ROLLING.

SPECIFICATION forming part of Letters Patent No. 516,764, dated March 20, 1894.

Application filed July 28, 1893. Serial No. 481,719. (No model.) Patented in England January 25, 1892, No. 1,421.

*To all whom it may concern:*

Be it known that we, CHARLES FAIRBAIRN and MATTHEW WELLS, subjects of the Queen of Great Britain and Ireland, residing at Manchester, in the county of Lancaster, England, have invented certain new and useful Improvements in Apparatus for Forging Screws by Rolling, (patented in Great Britain January 25, 1892, No. 1,421,) of which the following is a specification.

This invention relates to the construction and arrangement in machines for forging screws, of the rollers between and by means of which the screws are forged. Such machines as at present constructed have the objection that owing to the drawing out of the blank from which the screw is forged during the forging operation, its length is increased while the length of the rollers is fixed. Hence stripping of threads and other difficulties arise in working the machines which it is the object of this invention to remove.

In the accompanying drawings to which reference will hereinafter be had, a machine to which this invention relates is illustrated in longitudinal section by Figure 1 and in transverse section by Fig. 2. Fig. 3 is a back view, and Fig. 4 a side view of the forging rollers as constructed according to our present improvements. Fig. 5 is a front view of the rollers. Figs. 3, 4, and 5 are drawn to an enlarged scale. Fig. 6 is an elevation on a still larger scale of one of the rollers showing the screw-forming grooves thereon. Fig. 7 is an illustration of a screw having two different diameters such as may be rolled by the arrangement and construction of rollers illustrated.

In the machines as at present constructed the forging grooves are formed upon the peripheries of three rollers as illustrated by Fig. 1, save that in this illustration the rollers are represented as constructed according to this invention. The rollers A A' A² are arranged upon the ends of the shafts D D' D², on the opposite ends of each of which there is fixed a pinion E gearing with the internal toothed wheel F by which they are driven. In the front framing there are radially adjustable bearings M M for the spindles of the three rollers which overhang their bearings. There are also corresponding adjustable bearings for the spindles in the back framing. The internal toothed wheel is driven through a pinion on the shaft upon which the driving pulleys C C' are mounted. These pulleys are driven by a crossed and an open belt respectively so that by shifting one or other of the belts upon the fast center pulley, the apparatus may be driven in one direction or the other. The reversal of the motion is effected by the treadle H which operates the strap fork through the links and levers I I'. The lever I is counterweighted, and is capable of engaging with a hook P from which it may be disengaged by pressing forward the rod Q. On depressing the treadle the hook P engages with the lever I and the strap fork is thereby held in one position until it is desired to reverse the direction of rotation of the rollers by pressing the rod Q thus liberating the hook and allowing the counterweight R to pull over the strap fork so as to bring the other belt upon the center pulley.

In front of the machine there are two guide bars S, carrying the cross head T, in which the blanks are held, and in which is also fixed the adjustable stop U, which, when the blank has been fed forward by the cross head to the required distance, comes into contact with the end of the rod Q which it presses forward, thus effecting the reversal of the motion as already described, automatically.

It will be understood that the construction and arrangement of the machine are known and we therefore make no claim thereto, and have described them only to make the action of the forging disks or rollers more clearly understood.

In the construction of the rollers according to this invention we divide them into two or more lengths as shown in Fig. 4, of which the front length is firmly secured to its spindle. The other length or lengths is or are free to move longitudinally upon the spindle on which they can rotate but the motion in the backward direction is resisted by the bow springs V which abut against the front part of the framing. The rollers may be parallel, tapered, or have different diameters according to the nature of the screws desired to be produced, but in each case the larger diameter of the rollers are toward the back. Tapered rollers are employed for tapered screws, and parallel rollers for parallel screws and their construction is obvious. We have illustrated and will describe the more difficult case of rollers to produce a screw, Fig. 6, having two different diameters on one of which there is a right hand, and on the other a left hand thread. The rollers are respectively set out and constructed so that when they are mounted upon their spindles the spherical triangle included between them will just inclose the blanks, as shown by Fig. 5. Thus, the larger parts of the rollers will forge the smaller diameters of the screw and the smaller parts of the rollers the larger diameters of the screws. The larger diameters of the rollers move at a greater surface speed than the smaller diameters, and this differential motion causes that part of the blank which is in contact with the larger part to revolve at a higher speed, and consequently a certain amount of frictional resistance is induced, but, the larger part of the roller being free to move longitudinally, the difference is taken up by this longitudinal displacement. This arrangement enables tapered screws to be forged with facility without stripping the threads. Owing to the angular positions of the roller spindles, the rollers have a twist relatively to the axis of the blank, and allowance for this twist must be made in cutting the grooves which form the threads as in the existing machines. As the larger amount of work has to be done by the sliding parts of the rollers in reducing the diameter of the blank as well as in forming the screw, the displacement of the metal results in the elongation of the screw. But for the transverse division of the rollers this could not be allowed for.

Having now particularly described and ascertained the nature of our said invention and in what manner the same is to be performed, we declare that what we claim is—

1. In screwing machines in which the screws are forged between rotary grooved rollers, and in which the grooves are formed upon the peripheries of the rollers, a roller divided transversely into two or more parts of which the front part only is fixed upon the roller spindle, substantially as and for the purpose hereinbefore described and as illustrated by the accompanying drawings.

2. In screwing machines in which the screws are forged between rotary grooved rollers and in which the grooves are formed upon the peripheries of the rollers, the combination with transversely divided rollers the front portion of which alone is fixed upon the spindle, of a spring tending to resist the longitudinal motion of the back portion or portions of the roller, substantially as hereinbefore described and as illustrated by the accompanying drawings.

In testimony that we claim the foregoing as our invention we have signed our names, in presence of two witnesses, this 24th day of March, 1893.

CHARLES FAIRBAIRN.
MATTHEW WELLS.

Witnesses:
WILLIAM GEO. HAYS,
ARTHUR HILLIAM PULLMAN.